United States Patent
Gelli et al.

(10) Patent No.: US 11,243,698 B2
(45) Date of Patent: Feb. 8, 2022

(54) INITIALIZING STRIPES IN STORAGE ARRAY

(71) Applicant: Seagate Technology LLC, Cupertino, CA (US)

(72) Inventors: Kishan Gelli, Longmont, CO (US); Ryan Patrick McCallister, Erie, CO (US)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 15/931,799

(22) Filed: May 14, 2020

(65) Prior Publication Data
US 2021/0357136 A1 Nov. 18, 2021

(51) Int. Cl.
*G06F 3/06* (2006.01)
*G06F 11/10* (2006.01)

(52) U.S. Cl.
CPC ............ *G06F 3/0632* (2013.01); *G06F 3/064* (2013.01); *G06F 3/0619* (2013.01); *G06F 3/0644* (2013.01); *G06F 3/0659* (2013.01); *G06F 3/0689* (2013.01); *G06F 11/1092* (2013.01)

(58) Field of Classification Search
CPC .................................................. G06F 3/0632
USPC .................... 714/764, 763, 770, 765, 767
See application file for complete search history.

(56) References Cited

U.S. PATENT DOCUMENTS

| | | | | |
|---|---|---|---|---|
| 5,832,198 A * | 11/1998 | Lucht | .............. | G06F 11/1076 714/6.24 |
| 6,609,176 B1 * | 8/2003 | Mizuno | .............. | G06F 3/0601 711/112 |
| 6,981,171 B2 | 12/2005 | Hashemi | | |
| 6,993,676 B2 * | 1/2006 | Corbin | .............. | G06F 11/1092 714/13 |
| 8,032,703 B2 * | 10/2011 | Tanimoto | .............. | G06F 11/1076 711/114 |
| 2017/0212805 A1 * | 7/2017 | Zhu | .............. | G06F 3/0689 |
| 2018/0336139 A1 * | 11/2018 | Rao | .............. | G11C 16/105 |

* cited by examiner

*Primary Examiner* — Fritz Alphonse
(74) *Attorney, Agent, or Firm* — Mueting Raasch Group

(57) ABSTRACT

Initialization stripes of a redundant array of inexpensive disks (RAID) may include determining whether the stripes have already been initialized based on redundant correction information. Further, un-initialized stripes may be initialized before intended if write requests are received for such un-initialized stripes. Still further, rebuilt stripes (e.g., portions thereof) may also be checked to determine whether such rebuilt stripes have been initialized based on error detection codes.

20 Claims, 10 Drawing Sheets

| Stripe # | Virtual LBA | Drive 0 | Drive 1 | Drive 2 | Drive 3 |
|---|---|---|---|---|---|
| 1 | 0 | Host LBA 0 | Host LBA 1 | P Parity 1 | Q Parity 1 |
| 2 | 80 | Host LBA 2 | P Parity 2 | Q Parity 2 | Host LBA 3 |
| 3 | 100 | P Parity 3 | Q Parity 3 | Host LBA 4 | Host LBA 5 |
| 4 | 180 | Q Parity 4 | Host LBA 6 | Host LBA 7 | P Parity 4 |
| 5 | 200 | Host LBA 8 | Host LBA 9 | P Parity 5 | Q Parity 5 |

Fig. 6

ID STRIPES IN STORAGE
ARRAY

The disclosure herein relates to initializing stripes of a storage array such as, e.g., a redundant array of inexpensive disks (RAID), and further to systems and devices for performing and implementing such initialization.

SUMMARY

One illustrative system may include a plurality of storage devices and a computing apparatus comprising one or more processors and operably coupled to the plurality of storage devices. The computing apparatus may be configured to define a plurality of stripes of data across the plurality of storage devices for a RAID array. Each of the plurality of stripes of data may include redundant correction information. The computing apparatus may be further configured to read a selected stripe of the plurality of stripes of data, determine whether the selected stripe has already been initialized based on the redundant correction information, and initialize the selected stripe if it is determined that the selected stripe has not been initialized.

One illustrative system may include a plurality of storage devices and a computing apparatus comprising one or more processors and operably coupled to the plurality of storage devices. The computing apparatus may be configured to define a plurality of stripes of data across the plurality of storage devices for a RAID array. Each of the plurality of stripes of data may include redundant correction information. The computing apparatus may be further configured to receive a write data block to be written to a selected stripe of the plurality of stripes of data, read the selected stripe of the plurality of stripes of data, determine whether the selected stripe has been initialized based on the redundant correction information, and initialize the selected stripe and write the write data block to the selected stripe if it is determined that the stripe has not been initialized.

One illustrative system may include a plurality of storage devices and a computing apparatus comprising one or more processors and operably coupled to the plurality of storage devices. The computing apparatus may be configured to define a plurality of stripes of data across the plurality of storage devices for a RAID array. Each of the plurality of stripes of data may include a plurality of data blocks, and at least one of the plurality of data blocks of each stripe of data comprises redundant correction information usable to rebuild the remaining data blocks of the plurality of data blocks. The computing apparatus may be further configured to rebuild at least one failed data block of a selected stripe of the RAID array based on the redundant correction information, read the selected stripe of the plurality of stripes of data, determine whether the selected stripe has been initialized based on one or more of a plurality of error detection codes within the plurality of data blocks of the selected stripe, and initialize the selected stripe if it is determined that the selected stripe has not been initialized.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

FIG. 6 is an illustrative table representing a plurality of stripes of a RAID system and an indicator indicating the last stripe to be initialized.

DETAILED DESCRIPTION

Figure 1:
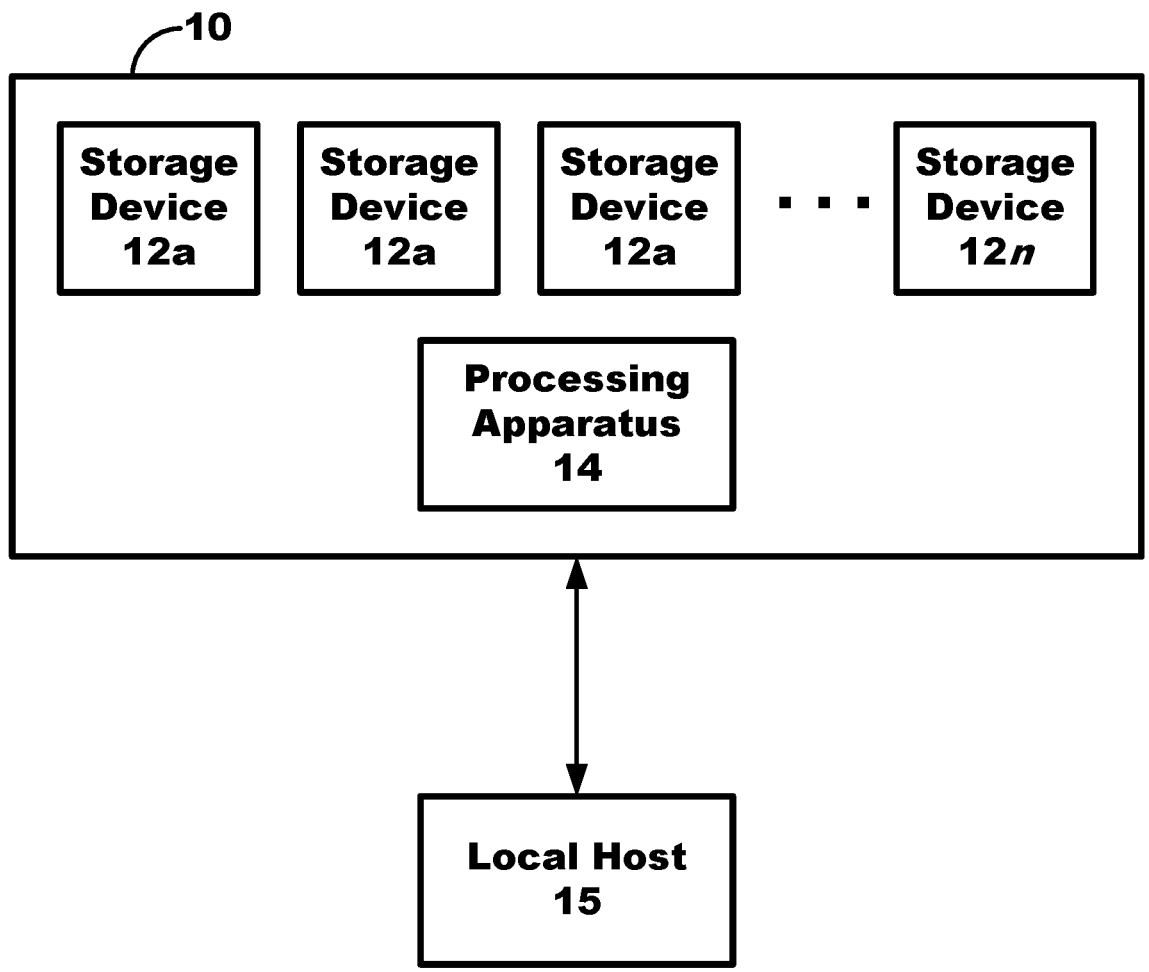
FIG. 1 is a block diagram representing an illustrative storage system including redundant array of inexpensive disks (RAID) that may utilize the illustrative methods and processes described herein.

Illustrative systems, methods and techniques shall be described with reference to FIGS. 1-12. It will be apparent to one skilled in the art that elements or processes from one embodiment may be used in combination with elements or processes of the other embodiments, and that the possible embodiments of such systems, methods, and techniques using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

Current storage systems and methods for array parity initialization may read a stripe from data drive sector blocks, generate the parity sector blocks using various parity generation processes and techniques (e.g., Reed Solomon, EVEN Odd, etc.), and then initialize the stripe. In storage systems and methods that employ protect information supported drives, the protection information (e.g., T10 protection information) of each data block includes a guard tag (e.g., cyclic redundancy check), a reference tag (e.g., a logical block address (LBA)), and an application tag. During parity initialization of a data stripe of a RAID system (e.g., generating a parity information for the data strip), the protection information of each of data block therein may be set to a default value, which may be problematic if the protection information already had accurate, usable information. For example, a data block may have already been written to prior to the data stripe including the data block being initialized into a RAID system, and thus, the guard tag may have already been updated in accordance with the data written to the data block. If the guard tag were updated to a default value during initialization of the stripe, the guard tag for the already written data block may be lost (and, e.g., then unable to provide a redundancy check of the data in the data block). Further, for example, the reference tag of a data block may have already been updated by to a host-supplied LBA. If the reference tag were updated to a default value during initialization of the stripe, the host-supplied LBA may be lost, which may result in error detection by the host system (e.g., corruption or considered data not written to RAID system).

Additionally, it may be described that current storage parity initialization may have limitations when using protection information drives for parity or non-parity initialization. For example, a RAID system parity or non-parity initialization does not keep track of host input/output (I/O) writes for the "above watermark region" (e.g., the data blocks of the stripes that have not yet been initialized). If a host I/O write operation to a specified LBA is above a parity initialization utility watermark (i.e., not initialized), the I/O routine may first generate the correct parity blocks before the host I/O write is satisfied. For the protect information supported drives, the host I/O LBA will also write the user-supported T10 protect information along with user data. Now, if the background parity initialization thread reaches the current watermark for the stripe where user data has already been written in the previous host I/O write operation, the background parity initialization thread may overwrite the user protect information data with default values, which results in undoing the previously-written protection information fields. Further, in a partial stripe write (e.g., read, modify, and then write), if the same write I/O comes to the same stripe again and if the write I/O is again above the watermark, the previously-written or -initialized stripe will again initialize to the default values.

Additionally, for the aborted parity initialization due to failed drives (e.g., such as in a RAID 5 array with one dead drive or a RAID 6 array with one or two dead drives), the parity protect information that was uninitialized as indicated as being above the watermark and any partial stripe writes for the dead drive will have data blocks having incorrect protection information. Further, the same issues may extend to rebuilding drives after aborting parity initialization such as, e.g., parity initialization methods for RAID 5 or RAID 6 arrays. Still further, protection information overwrite issues may also arise in non-parity disk-groups such as mirror and RAID 10 (e.g., which is a nested RAID level—a combination of stripe and mirror RAID levels).

The illustrative systems, methods, and techniques described herein are directed to solving various disadvantages of the prior art including protecting protection information for data or sector blocks in a storage system. The illustrative systems, methods, and techniques may be described as updating already correct protect information fields for each sector blocks correctly such that, e.g., a RAID system can maintain the integrity of the stripe without overwriting the host written blocks and protect information fields. Further, the illustrative systems, devices, and methods may handle aborted initializations so as to generate correct protection information for the uninitialized stripes.

For example, it may be described that the illustrative systems, methods, and techniques always check the integrity of the stripe before initializing the stripe. If the stripe parity is good with respect to all the drives, then the stripe may be skipped as opposed to being reinitializing. Further, the parity check may also be included in, or introduced to, I/O strategy in read and write paths. If the I/O LBA is above the watermark, then the parity should be checked prior to initialization of the stripe. If the stripe is initialized according to the parity check, then the I/O may be performed. If the stripe is not initialized according to the parity check, then a stripe scrub may be performed to fix the protect information flag turned on by locking the stripe, and after protect information is updated, then the read/write I/O may be performed.

It may be described that the illustrative systems, methods, and techniques may initialize data stripes from an I/O path or a utility path. Previously, each read and write during I/O may also re-initialize a stripe resulting in a performance hit. The illustrative systems, methods, and techniques improves performance because of parity stripe checking and no rewriting of stripes. Further, the illustrative systems, methods, and techniques result in data integrity being guaranteed for the disk group, which ensures integrity for non-filesystems I/O requests.

Illustrative systems, devices, methods, techniques, and data structures and paradigms that can be used in the embodiments described herein are depicted in FIGS. 1-6. A data storage system 10 operably coupled to a local host 15, e.g., for transferring data therebetween, as shown in FIG. 1. For example, the local host 15 may request data from the data storage system 10, and the data storage system 10 may provide such requested data to the local host 15. In at least one embodiment, the local host 15 is a computer (such as, e.g., a personal computer, server, etc.).

The data storage system 10 includes a plurality of storage devices 12 and a processing apparatus, or processor, 14 that are operably coupled (e.g., electrically coupled to transmit data therebetween) to each other. The illustrative systems, devices, methods, and techniques disclosed herein may be generally described in the context of the data storage system 10 and/or systems includes the data storage system 10, but that should in no way be taken as limiting the scope of the present disclosure. Generally, the data storage system 10 may be any device and/or apparatus comprising a plurality of storage devices 12 in which data may be written to and then read back from.

Each storage device 12 may be any device and/or apparatus configured to store a plurality of data blocks, or tracks of data, (e.g., binary data). The storage devices 12 can include, but is not necessarily limited to, solid state memory, hard magnetic discs, floppy discs, magnetic tapes, optical discs, integrated circuits, volatile memory, nonvolatile memory, etc. Generally, the plurality of data blocks, or blocks of data, of the storage devices 12 may be contained in non-volatile memory.

Non-volatile memory may include any kind of computer memory that can retain information stored thereon when not powered. Examples of non-volatile memory that may be utilized as the non-volatile main memory include, but are not limited to, read only memory (ROM), flash memory, hard drives, and random access memory (RAM). Examples of ROM include, but are not limited to, programmable ROM (PROM) which can also be referred to as field programmable ROM; electrically erasable programmable ROM (EEPROM) which is also referred to as electrically alterable ROM (EAROM); and erasable programmable ROM (EPROM). Examples of RAM include, but are not limited to, ferroelectric RAM (FeRAM or FRAM); magnetoresistive RAM (MRAM); resistive RAM (RRAM); non-volatile static RAM (nvSRAM); battery backed static RAM (BBSRAM); phase change memory (PCM) which is also referred to as PRAM, PCRAM and C-RAM; programmable metallization cell (PMC) which is also referred to as conductive-bridging RAM or CBRAM; nano-RAM (NRAM), spin torque transfer RAM (STTRAM) which is also referred to as STRAM; and Silicon-Oxide-Nitride-Oxide-Silicon (SONOS), which is similar to flash RAM.

In at least one embodiment, the storage devices 12 may include one or more magnetic discs. Each disc in the storage devices 12 may include a surface having a plurality of substantially concentric circular tracks or data tracks (e.g., each track comprising a plurality of blocks of data). In some embodiments, the data tracks on a magnetic disc-based storage device 12 are logically divided into a plurality of data storage sectors or portions. Each storage sector may be identified and located at various positions on disc. In the disc-type storage medium example illustrated, the sectors, may be "pie-shaped" angular sections of a track that are bounded on two sides by radii of the disc and on the other side by the perimeter of the circle that defines the track.

The processing apparatus 14 may include various circuitry, logic, memory, etc. for use in the reading, writing, and decoding data from the storage devices 12 and/or managing a redundant array of inexpensive disks or drives (RAID) utilizing the plurality of storage devices 12. For example, the processor 14 may include one or more circuit components such as integrated circuits, processors, etc. that may be configured to interface with the storage devices 12 to read and write data therein, to initialize one more stripes of RAID system, etc. Among other things, the processing apparatus 14 may be configured to determine whether a stripe of a RAID system has already been initialized based on various information as will be further described herein with respect to FIGS. 7-12. Thus, the processing apparatus 14 may be used for executing, or carrying out, multiple operations with respect to data storage and retrieval and RAID operations using the plurality of data storage devices 12.

The methods, techniques, and/or processes described in this disclosure, including those attributed to the processor, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processing apparatus," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure.

Figure 2:
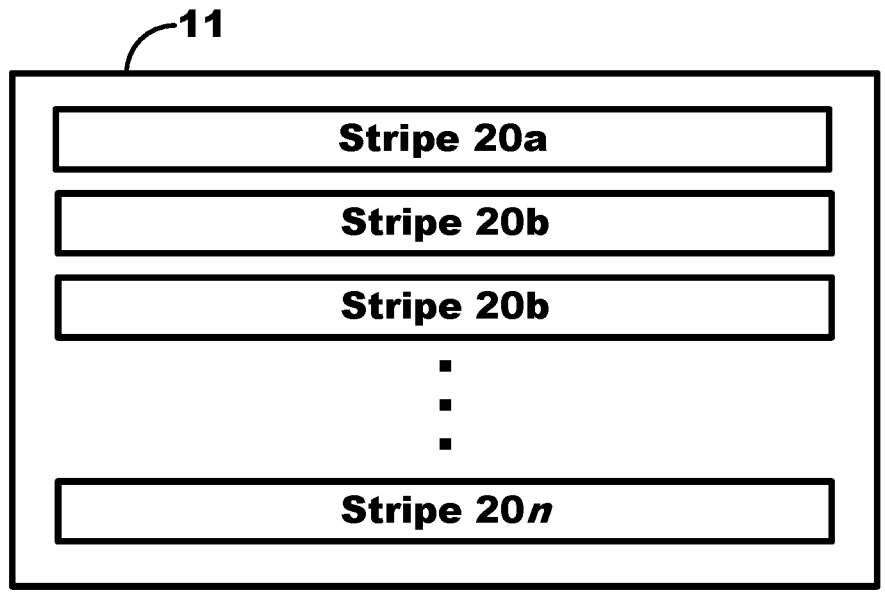
FIG. 2 is a block diagram representing an illustrative RAID system including a plurality of stripes that may utilize the illustrative methods and processes described herein.

A RAID system 11 is depicted in FIG. 2. As shown, the RAID system 11 includes a plurality of stripes of data 20. The stripes of data 20 may be formed using a plurality of blocks of data of the data storage devices 12 of FIG. 1. In this way, the RAID system 11 may be formed or defined in the data storage system 10 utilizing the plurality of data storage devices 12 contained therein.

Figure 3:
FIG. 3 is a diagrammatic representation of an illustrative stripe of the RAID system of FIG. 2.

Each stripe 20 of a RAID system may include data blocks 22 as shown in FIG. 3 from a plurality of different storage devices 12 such that, if one or more storage devices 12 fail, then the failed or missing blocks data may be rebuilt using the data blocks 22 that are located on non-failed storage devices 12. More specifically, each stripe 20 of the RAID system 11 includes blocks 22 of user data and blocks 22 of redundant correction information. The blocks 22 of redundant correction information may be used to correct or replace the blocks of user data 22 or blocks of redundant correction information 22, if such blocks 22 of user data are lost due to failed storage devices 12. Many different types of RAID that provide redundant correction information exist such as, e.g., RAID 1, RAID 2, RAID 3, RAID 3, RAID 5, RAID6, etc., each of which may be utilized with the disclosure provided herein.

Figure 4:
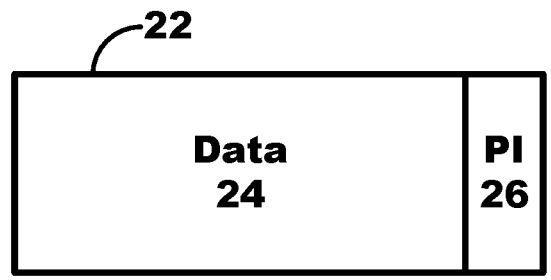
FIG. 4 is a diagrammatic representation of an illustrative data block of the stripe of FIG. 3.

A data block 22 is depicted in FIG. 4. Each data block 22 may include two portions: a data 24; and a protection information 26. The data 24 may be the user or system data intended for storage in the storage system 10. The protection information 26 is the additional information provided in systems that employ protection information storage devices. At least the following four different device protection types exist: Type 0: No checking; Type 1: Guard+Reference Checking (LBA); Type 2: Guard+Reference checking (Extended Indirect LBA) and Read/Write commands only; and Type 3: Guard. In Type 2 device protection, reference checking may exist at multiple points along data transmission between a host 15 and a data storage device 12. For example, protection information detection may occur at the host bus adapter (HBA), host interface controller, the storage system processing apparatus, the storages device processing apparatus, etc. Thus, if protection information is overwritten or set to default values during RAID stripe initialization, protection information detection at the multiple locations or points described herein may result in various errors.

Figure 5:
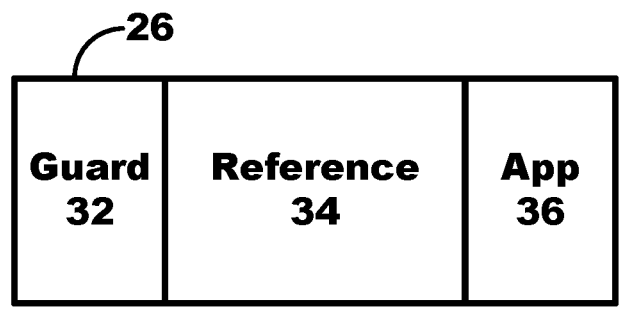
FIG. 5 is a diagrammatic representation of an illustrative protection information portion of the data block of FIG. 4.

The protection information 26 depicted in FIG. 5 includes three portions: a guard tag 32; a reference tag 34; and an application tag 36. Generally, the guard tag 32 may be described as an error detection code for the data 24, and in some examples, may also be an error correction code to correct up to a selected number of errors in the data 24. Generally, the reference tag 34 may be described or may include address information such as a logical block address of the data block 20 provided by the storage device 12 or provided by a host 15 depending on the state of initialization and utilization. Generally, the application tag 36 may be described as information that may be used by any application for any reason. In other words, the application tag 36 may be "up for grabs" by application of the storage system 10 or host 15.

In one example, each data block 22 is 520 bytes with 512 bytes being the data 24 and the remaining 8 bytes being the protection information 26. In another example, each data block 22 is 4 kilobytes with 8 bytes being the protection information 26 and the remaining bytes being the data 24. The guard tag 32 may be a 16 bit, or 2 byte, cyclic redundancy code (CRC). The reference tag 34 may be a 32 bit, or 4 byte, address such as a logical block address (LBA). When utilizing Type 2 protection, the reference tag 34 should match the LBA in a command descriptor block (CDB). The application tag 36 may be 16 bits, or 2 bytes, and the ownership may be negotiated with the target.

A RAID system 11 may be initialized prior to any data being written thereto or may be initialized after data has already been stored therein. Additionally, the RAID system 11 may be initialized at the same time as data is being written thereto. More specifically, while the RAID system 11 is being initialized, data may be read or written to one or more data blocks comprising, or making up, the RAID system 11. In the examples where data is already stored in the data blocks 22 that will comprise the RAID system 11 and where data may be written to one or more data blocks 22 during RAID system 11 initialization, problems may arise when protection information of data blocks 22 that is already accurate is overwritten by the initialization process. Thus, in at least some examples the RAID system initialization process may be described as a "background" process that does not interrupt the storage and retrieval of data on the data storage devices 12 that will comprise the RAID system 11.

One illustrative process of RAID initialization that monitors, or "keeps track of," what stripes 20 of the RAID system 11 have been initialized uses an ordered list of stripes and an identifier, or watermark, indicating the last stripe within the ordered list of stripes that has been initialized. An illustrative table including an ordered list of stripes 40 of a RAID system and an identifier, or watermark, 42 indicating the last stripe to be initialized is depicted in FIG. 6. As shown, the RAID system in this example includes five stripes, numbered 1 through 5, each including a virtual LBA, 0, 80, 100, 180, and 200, in this example. Further, the RAID system utilized four storage devices, numbered 0 to 3, and utilizes two P and Q redundant correction information such as in, for example, a RAID 6 system.

The identifier, or watermark, 42 is shown between stripe #2 and stripe #3 indicating that stripes #1 and #2 have already been initialized (e.g., below the watermark) and that stripes #3, #4, and #5 have not yet been initialized (e.g., above the watermark). Additionally, the location of the identifier 42 may also indicate that stripe #3 is presently being initialized. Thus, the illustrative systems and methods described herein may maintain an identifier 42 of the last stripe of the plurality of stripes of a RAID system to be initialized. As will be described further herein, prior to reading a selected stripe or writing to a selected stripe, the illustrative systems and methods may determine whether the selected stripe has already been initialized based on the identifier 42 of the last stripe to be initialized and may prevent certain processes including, among others, re-initializing the selected stripe if it is determined that the selected stripe has already been initialized based on the identifier of the last stripe of the plurality of stripes to be initialized.

A flow diagram of an illustrative method 50 of initializing a stripe into a RAID system. The method 50 may include defining a plurality of stripes of data across a plurality of data storage devices for a RAID system 52. More specifically, for example, a plurality of data blocks across a plurality of storage devices may be determined to be placed into or configured into a RAID system such as e.g., a RAID 5 system, and the plurality of data blocks may be "locked" into a plurality of data stripes for the RAID system with portions or blocks of each data stripe being designated for user or host data and other portions or blocks of each data being designated for redundant correction information. The redundant correction information may be used to correct the portions or blocks of user or host data if storage of such data fails, e.g., due to a failed storage device.

The method 50 may then read a selected stripe 54 prior to initialization and determine whether the selected stripe has already been initialized based on the redundant correction information 56. For example, the redundant correction information (e.g., P or Q data in RAID 5) for the selected stripe may be used for a parity check to determine whether the data blocks used for user or host data storage is correct. If the parity check is successful indicating that the data blocks used for user or host data is correct, then the stripe has already been initialized, and does not need to be re-initialized. Re-initialization of such selected stripe may result in protection information errors because, e.g., such re-initialization may overwrite already accurate or correct protection information such as guard tags, reference tags, and application tags to default values. More specifically, for example, if the reference tag is overwritten, reference checking along at multiple points along data transmission between a host 15 and a data storage device 12 may result in errors since, e.g., the reference tag would no longer be accurate.

Additionally, in one or more embodiments, instead of or in conjunction with utilizing the redundant correction information to determine whether the selected stripe has been initialized, the illustrative systems and methods may utilize the protection information of one or more data blocks of the selected stripe to determine whether the selected stripe has been initialized. For example, the error-detection code, or guard tag, of one or more data blocks, a plurality of data blocks, or all of the data blocks of the selected stripe may be processed to determine whether the user or host data portion of the data block is correct. If the user or host data portion(s) of the data block(s) are correct, then the selected stripe may be determined to have been initialized. Conversely, if the user or host data portion(s) of the data block(s) are not correct, then the selected stripe may be determined to have not been initialized.

If the selected stripe has not been initialized 56, then the method 50 may initialize the selected stripe 58. Initializing the stripe 58 may include modifying the redundant correction information of the stripe to provide redundant protection of the selected stripe. For example, since one or more data blocks or portions of the stripe have already been allocated for the protection information, such data contained therein (e.g., factory defaults if the drives are new, old data from previously used drives, etc.), may be modified. In other words, whatever bits were recorded in the redundant correction information space of the selected stripe may be overwritten by newly generated redundant correction information for the user or host data of the selected stripe.

Additionally, initializing the stripe 58 may include generating the protection information or one or more portions of the protection information for each block of the plurality of blocks of the selected stripe. For example, one or more of the error detection code or guard tag, the address tag (e.g., logical block address), and application tag may be set to default values since, e.g., such data blocks have not yet been initialized and may not contain actual data (e.g., user or host data, useable redundant correction information, etc.).

Furthermore, during initialization of a RAID system (e.g., initializing one stripe at a time in a RAID system), the illustrative storage systems and methods may receive data to be written to one or more data blocks of the plurality of storage devices to define, or make up, the RAID system. A flow diagram of an illustrative method 60 of writing a data block to a stripe of a RAID system presently being initialized is depicted FIG. 8. Similar to method 50, a plurality of stripes of data may be defined across a plurality of data storage devices for a RAID system 61, and as such, will not be further described with respect to method 60.

During initialization of the RAID system, a write data block may be received 62 to be stored on either an already initialized stripe or an uninitialized stripe. More specifically, in one or more embodiments, the address (LBA) for the write data may be received. A write data block may be written to a stripe that is not indicated as being initialized according to the indicator, or watermark, 42 as described herein with respect to FIG. 6. To determine whether a selected stripe is initialized despite not being above the indicator, or watermark, 42, the method 60 read the selected stripe 63 and determine whether the selected stripe has already been initialized based on the redundant correction information 64, similar to processes 54, 56 described herein with respect to FIG. 7, and as such, will not be further described with respect to method 60.

If the selected stripe has been initialized 64, then the method 60 may write the data block to the selected stripe 66. If the selected stripe has not been initialized 64, then the method 60 may initialize the selected stripe 65 similar to process 58 described herein with respect to FIG. 7, and as such, will not be further described with respect to method 60, and then the method 60 may write the data block to the now-initialized, selected stripe 66.

During initialization of a RAID system, a storage device or drive may fail, which may result in one or more data blocks of a stripe failing. The failed data blocks may be rebuilt using the remaining data blocks of the stripe. However, since the rebuilt data blocks have been rebuilt based on the remaining data blocks including redundant correction information, the redundant correction information of the stripe cannot also be used to also determine whether the stripe has been initialized or not.

Figure 9:
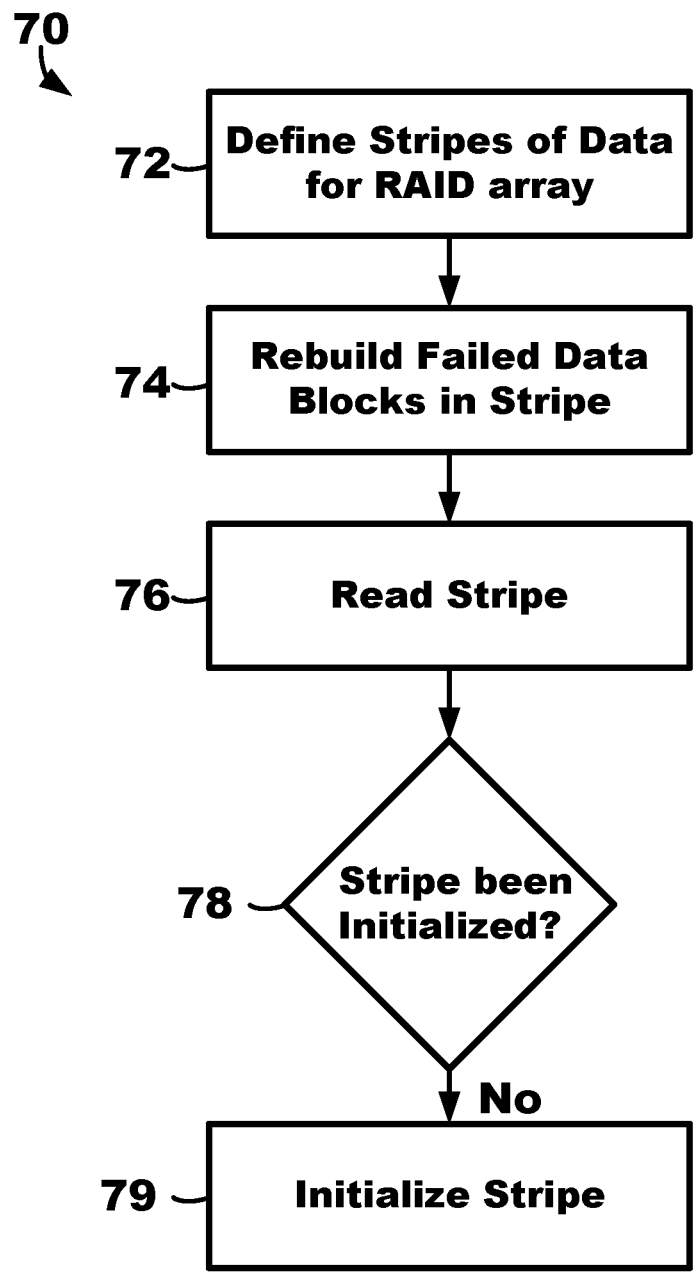
FIG. 9 is a flow diagram of an illustrative method of rebuilding failed data blocks of a stripe of a RAID system and initializing the stripe if uninitialized.

An illustrative method 70 of rebuilding failed data blocks of a stripe of a RAID system and initializing the stripe if uninitialized is depicted in FIG. 9. Similar to method 50, a plurality of stripes of data may be defined across a plurality of data storage devices for a RAID system 72, and as such, will not be further described with respect to method 70.

In this method 70, a storage device or one or more data blocks thereof fails while the stripes of the RAID system are being initialized. The failed data blocks of each stripe may be rebuilt 74 using the redundant correction information of each stripe. To determine whether a selected stripe is initialized despite not being above the indicator, or watermark, 42, the method 70 read the selected stripe 76 similar to process 54 described herein with respect to FIG. 7, and as such, will not be further described with respect to method 70.

The method 70 may then determine whether the selected stripe has already been initialized based on error-detecting codes within at least one of the plurality data blocks of the selected stripe 78. For example, an error-detecting code, or the guard tag, of the protection information of one or more of the plurality of data blocks of the selected data stripe may be processed to determine whether the user or host data portion of the data block is correct. If the user or host data portion of the data block is correct according to the error-detecting code, then the selected stripe may be determined to have been initialized. Conversely, if the user or host data portion of the data block is not correct according to the error-detecting code, then the selected stripe may be determined to have not been initialized.

Additionally, it to be understood that one, more than one, or all data blocks of the plurality of data blocks of the selected stripe may be checked using their respective error-detecting code to determine whether the selected stripe has been initialized. For example, if a single data block of the selected stripe is checked using its error-detecting code and determined to be errant, then the selected stripe may be determined to have not been initialized. For example, if a selected number or percentage of data blocks of the selected stripe are determined to be errant according to their respective error-detecting codes, then the selected stripe may be determined to have not been initialized.

Conversely, for example, if a single data block of the selected stripe is checked using its error-detecting code and determined to be correct, then the selected stripe may be determined to have been initialized. Also, for example, if a selected number or percentage of data blocks of the selected stripe are determined to be correct according to their respective error-detecting codes, then the selected stripe may be determined to have been initialized.

Figure 7:
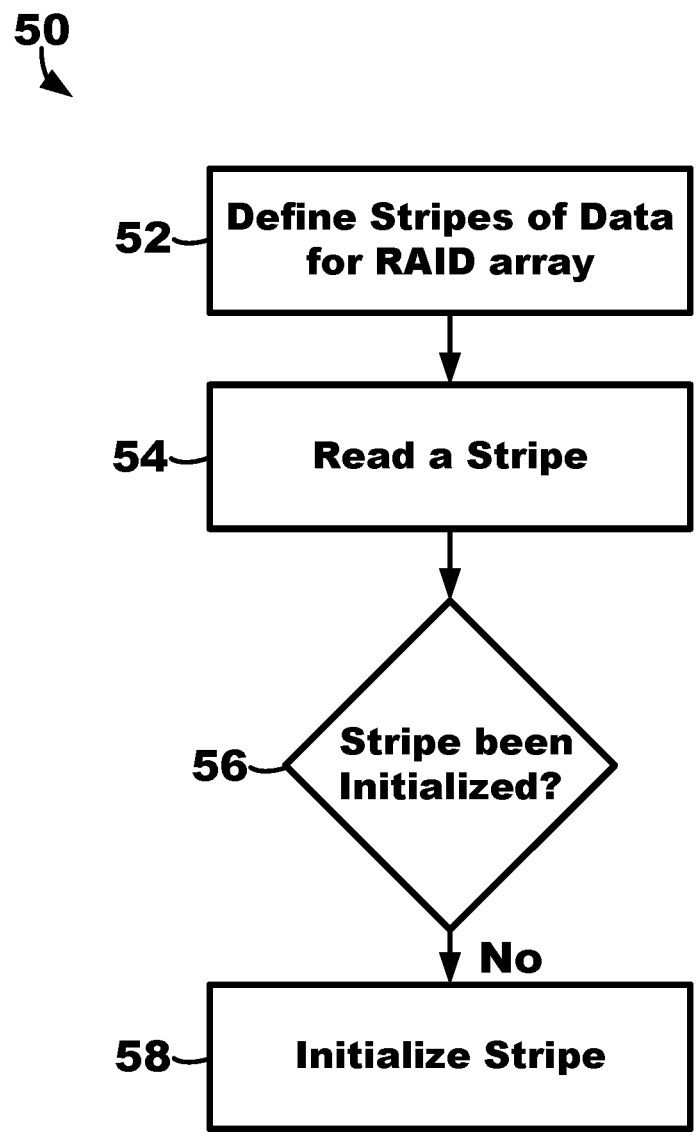
FIG. 7 is a flow diagram of an illustrative method of initializing a stripe of a RAID system.
Figure 8:
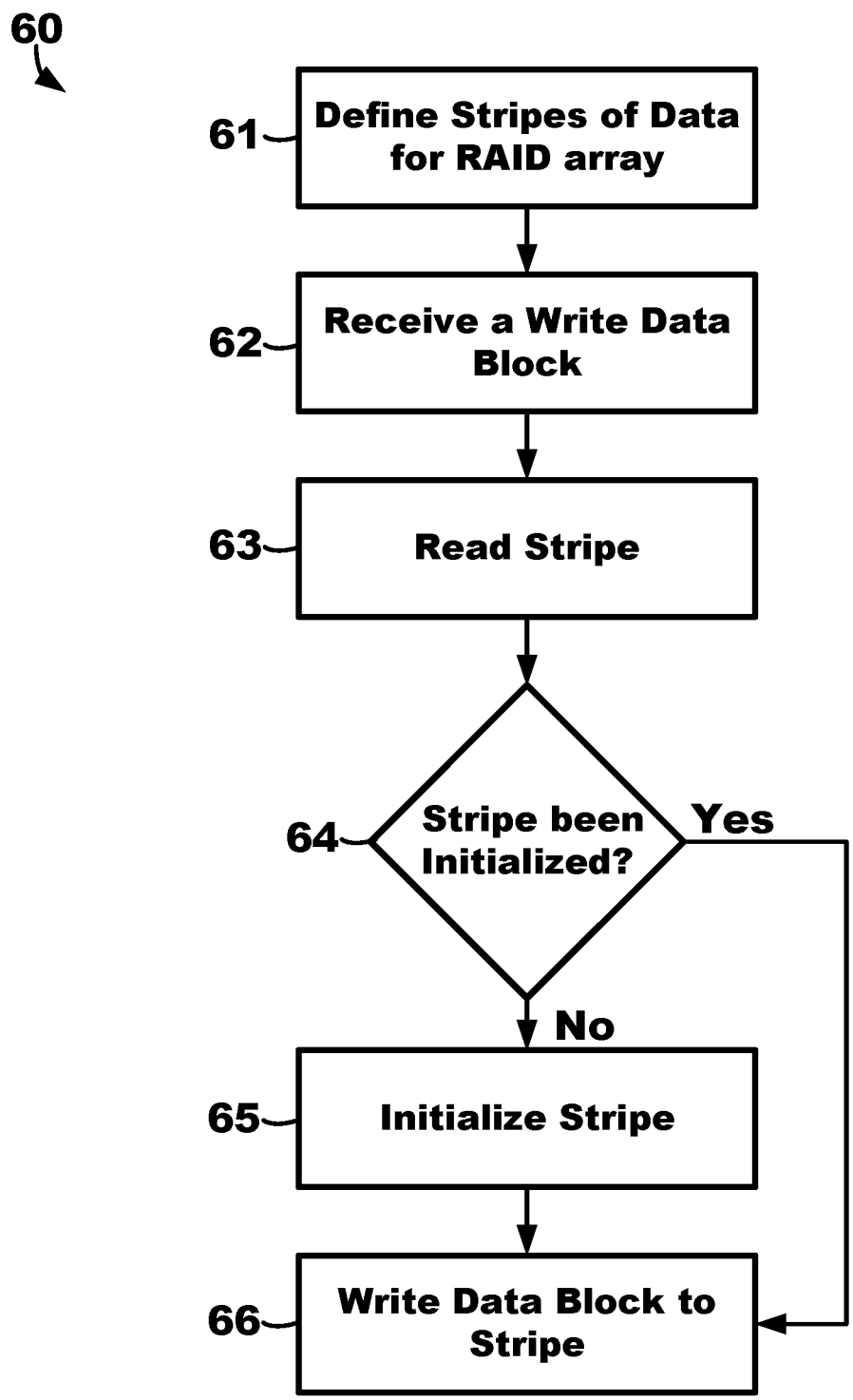
FIG. 8 is a flow diagram of an illustrative method of writing a data block to a stripe of a RAID system presently being initialized.

If the selected stripe has not been initialized 78, then the method 70 may initialize the selected stripe 79 similar to process 58 described herein with respect to FIG. 7, and as such, will not be further described with respect to method 70.

Figure 10:
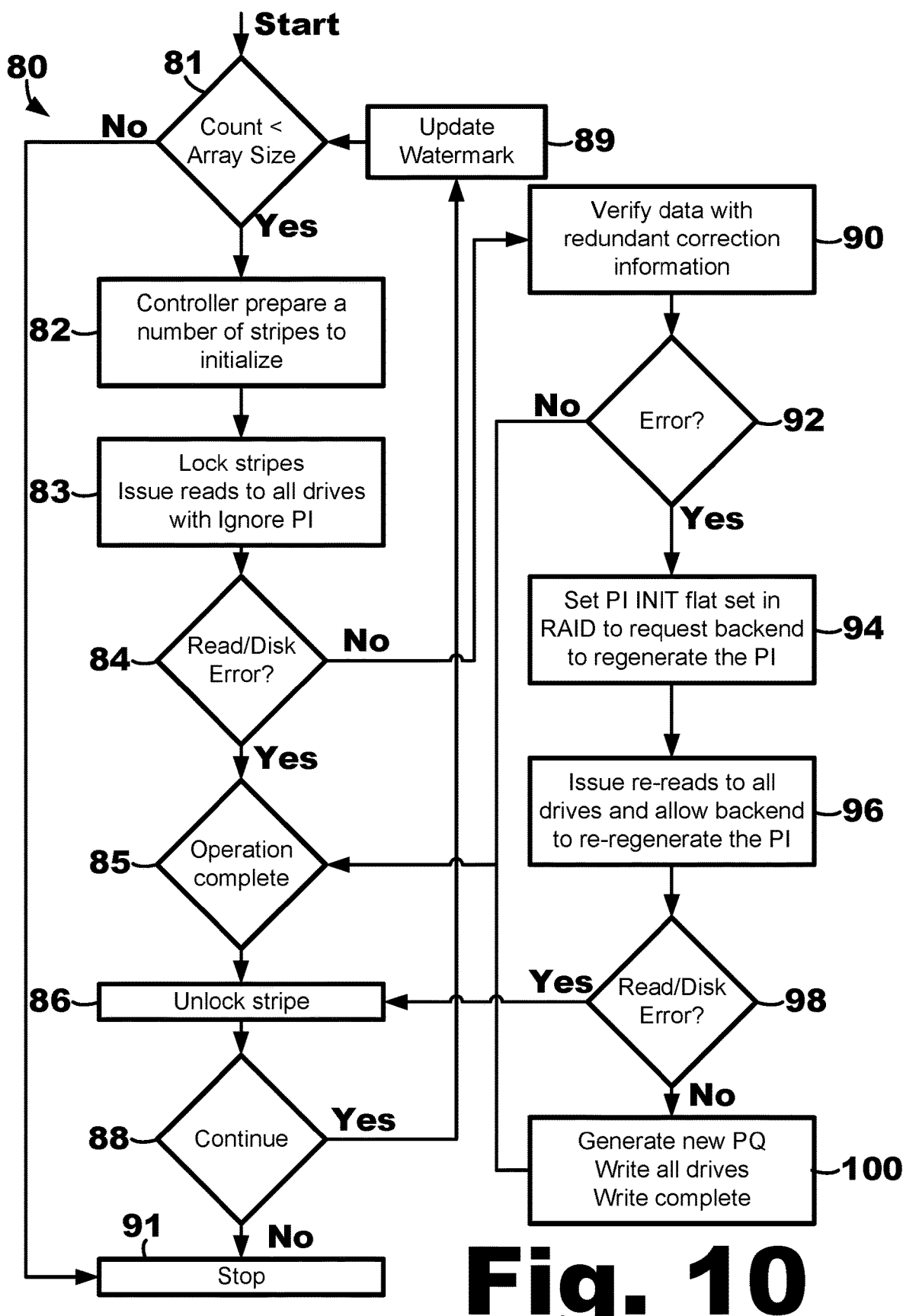
FIG. 10 is flow diagram of an illustrative method of initializing a diskgroup.

A flow diagram of illustrative method 80 of initializing a diskgroup system is depict in FIG. 10. The method 80 may be performed on any diskgroup or array such as for example, e.g., a mirror or parity-based diskgroup or array.

The method 80 may start by determining whether the count is less than the array size 81. The array size may refer to the number of stripes of the diskgroup, and the count may refer to the total number of stripes that have been initialized. If the count (i.e., the number of stripes that have been initialized) is greater than or equal to the array size 81, then the method 80 may stop or end 91. If the count (i.e., the number of stripes that have been initialized) is less than the array size 81, then the method 80 may continue to prepare a number of stripes, e.g., to the extent of the logical block address range, to initialize 82.

Once the stripes are prepared, the stripes are locked and reads are issued to all drives with an ignore protect information command 83. For example, the read may be initiated with verify parity (such as, e.g., P or Q) blocks for all locked stripes. To do so, the backend (e.g., LSI SAS initiator) may be notified to read data blocks with the ignore protection information flag set. Additionally, all the drives used to check parity may be read. For example, in a RAID 5 system, all of the data drives and parity drives should be read. Further, for example, in mirrored disk-groups, both drives would be read.

If there is read or disk error 84, then the method 80 may proceed to completing the operation 85 and unlocking the stripe 86. If there is not a read, or disk, error 84, then the method 80 may proceed to verifying data stripe using the redundant correction information associated therewith (e.g., contained within the stripe) 90. For example, verify parity check (e.g., confirming P or Q blocks are correct) may be initiated on the stripe using the RAID XOR engine with protection information capability. It may be noted that the protection information may be verified on P or Q buffer result. Further, for example, an XOR command may be used to verify whether the P or Q buffer is not good, which would indicate as a stripe error.

The verification of the stripe using redundant correction may result in no error 92 indicating that the stripe has been initialized because, e.g., the protection information would be accurate for the parity check using the redundant correction information to not return an error. Thus, if no error is indicated 92, the method 80 may proceed to completing the operation 85 and unlocking the stripe 86.

The verification of the stripe using redundant correction may result in an error 92 indicating that the stripe has not been initialized. More specifically, for example, if there is an error in parity (P or Q) buffer (e.g., both data and PI tags bad), then the stripe is not initialized. In this case, the protection information flag may be set in RAID to request the backend to regenerate new protection information for each of the data blocks of the stripe 94 and re-reads will be issued to all drives and the backend may be allowed to re-generate the protection information (PI) 96. More specifically, for example, the stripe may be re-setup for read and the PI flag may be set "initialize protection information" to regenerate the PI.

Additionally, please note that the PI data may be generated during read operations and not write operations. The newly-generated PI data may be appended to each data block when the disk read I/O is completed. The backend may regenerate the PI for the stripe with default PI information such as the following: app tag->a default value such as 0xff; ref tag->vdisk LBA; and guard tag->good CRC (newly-computed or newly-generated CRC based on data portion of data block).

Next, if there is read or disk error 98, then the method 80 may proceed to unlocking the stripe 86. If there is not a read or disk error 98, then the method 80 may proceed to generating new P and Q (i.e., redundant correction information), writing all drives, and completing such writes 100. In other words, good parity P and Q buffers may be generated, the data disks (which now have good PI) may be updated, and new parity data P or Q for the stripe may be updated on all the disks.

After writing is complete 100, the method may proceed to unlocking the stripe 86 and then determining whether to continue 88. If the method 80 is to continue, the watermark, or indicator, indicating the last stripe of the plurality of stripes listed in an ordered list may be updated 89, and the method 80 may again determine whether the count is less than the array size 81. If the method 80 is not to continue, the method 80 may stop 91. In this way, the method 80 may continue looping until each of the plurality of stripes of the diskgroup are initialized or the method 80 is stopped for another reason. It is to be understood that this method 80 may be performed in the background so as to allow I/O using the plurality of storage devices making up or to make up the RAID system. Additionally, it is be understood that the method, or state machine, 80 may also be applicable to mirrored diskgroups such as, e.g., RAID 1, but it would compare, or check between, master and slave drives.

Figure 11:
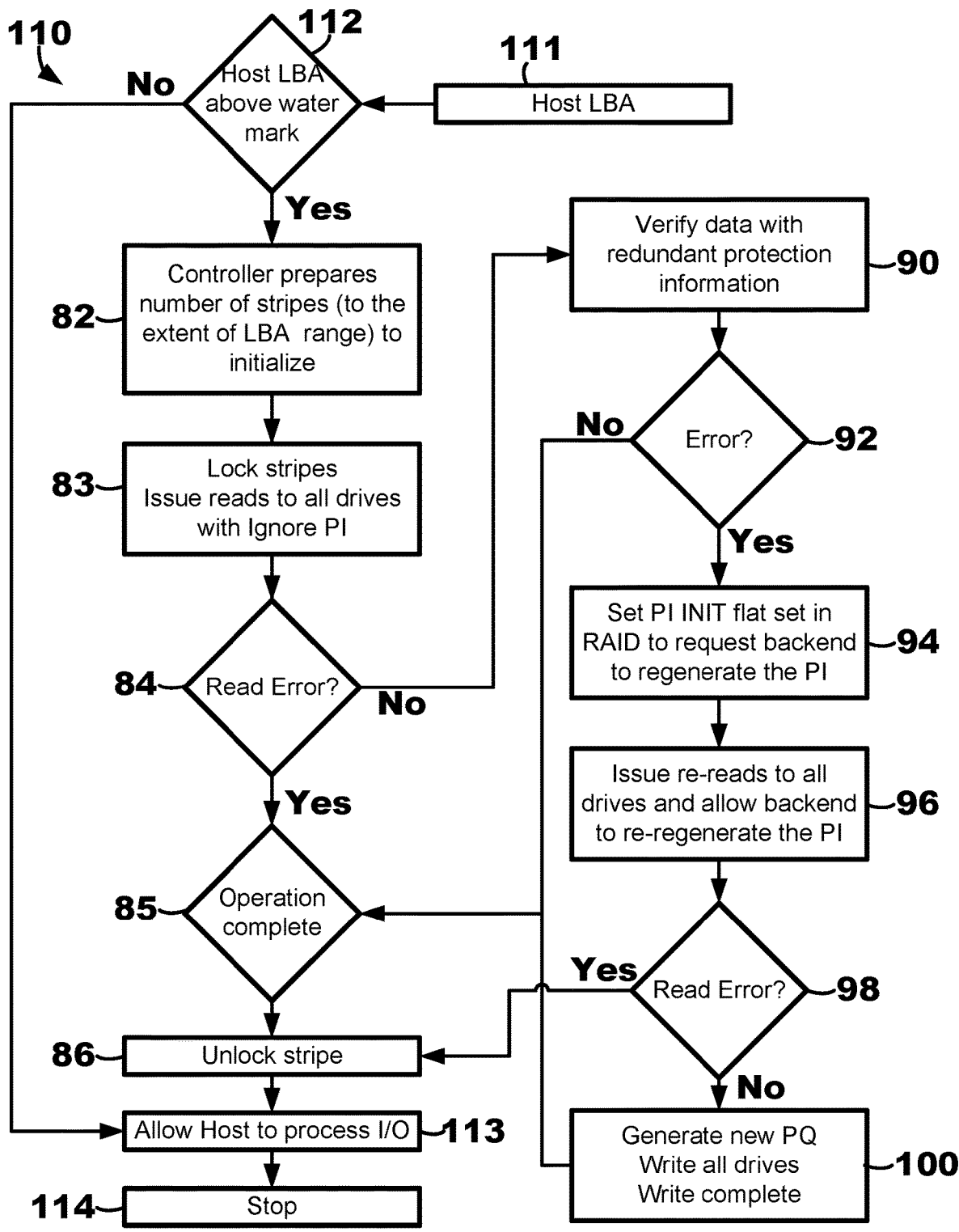
FIG. 11 is flow diagram of an illustrative method of writing a data block to a stripe of a diskgroup presently being initialized.

A flow diagram of illustrative method 110 of initializing a stripe of a diskgroup prior to writing a data block thereto is depicted in FIG. 11. The method 110 is similar to the method 80 described herein with respect to FIG. 10, and as such, many processes, or steps, of method 110, which are numbered the same as in method 80, will not be further described herein. Different from method 80, however, method 110 includes receiving partial write data or at least the location for potential write data (host LBA) from the host 111 to be written to one or more stripes of an illustrative RAID system. First, the method 110 may determine whether the location of the write data or the host LBA is above the indicator, or watermark, 112 that indicates whether the stripe has been initialized. If the stripe where the data is to be written (host LBA) has been initialized as determined by the indicator or watermark, then the method 80 may proceed to allowing the host I/O process the I/O 113 and then stopping the method 114.

If the stripe where the data is to be written (host LBA) has not been initialized as determined by the indicator or watermark, then the method 80 may proceed to determining whether stripe has already been initialized, despite the indicator or watermark, and then initiating the non-initialized stripes using the same or similar processes as described herein with respect to method 80 of FIG. 10 prior to allowing the host I/O to be processed 113.

In one or more embodiments, the method 110 may be referred to as an I/O path check parity. It may be described that the I/O path check parity first determines if the host I/O LBA is below watermark, and if so, continues the I/O to be processed in the RAID engine. If the host I/O LBA is above watermark, the stripe may be locked and a read may be initiated on all locked stripes. If the read is verified as being successful, and a check PI on the stripe may be initiated using the RAID XOR engine with PI capability. Further, the check parity result may be verified for any stripe error on the parity buffer. If there is an error in parity buffer (e.g., in the app tag, in the CRC tag, in the data blocks, etc.), then the stripe is not initialized, and the stripe may be re-setup for read with the PI regenerate bit or flag. The backend may regenerate the PI for the stripe with default PI information such as the following: app tag->a default value such as 0xff; ref tag->vdisk LBA; and guard tag->good CRC (newly-computed or newly-generated CRC based on data portion of data block). Further, good parity buffer information may be generated, and the data disks may be updated with good PI and new parity data for the stripe on to the disk. Then, the host I/O may be completed and the locked stripe may be released.

Figure 12:
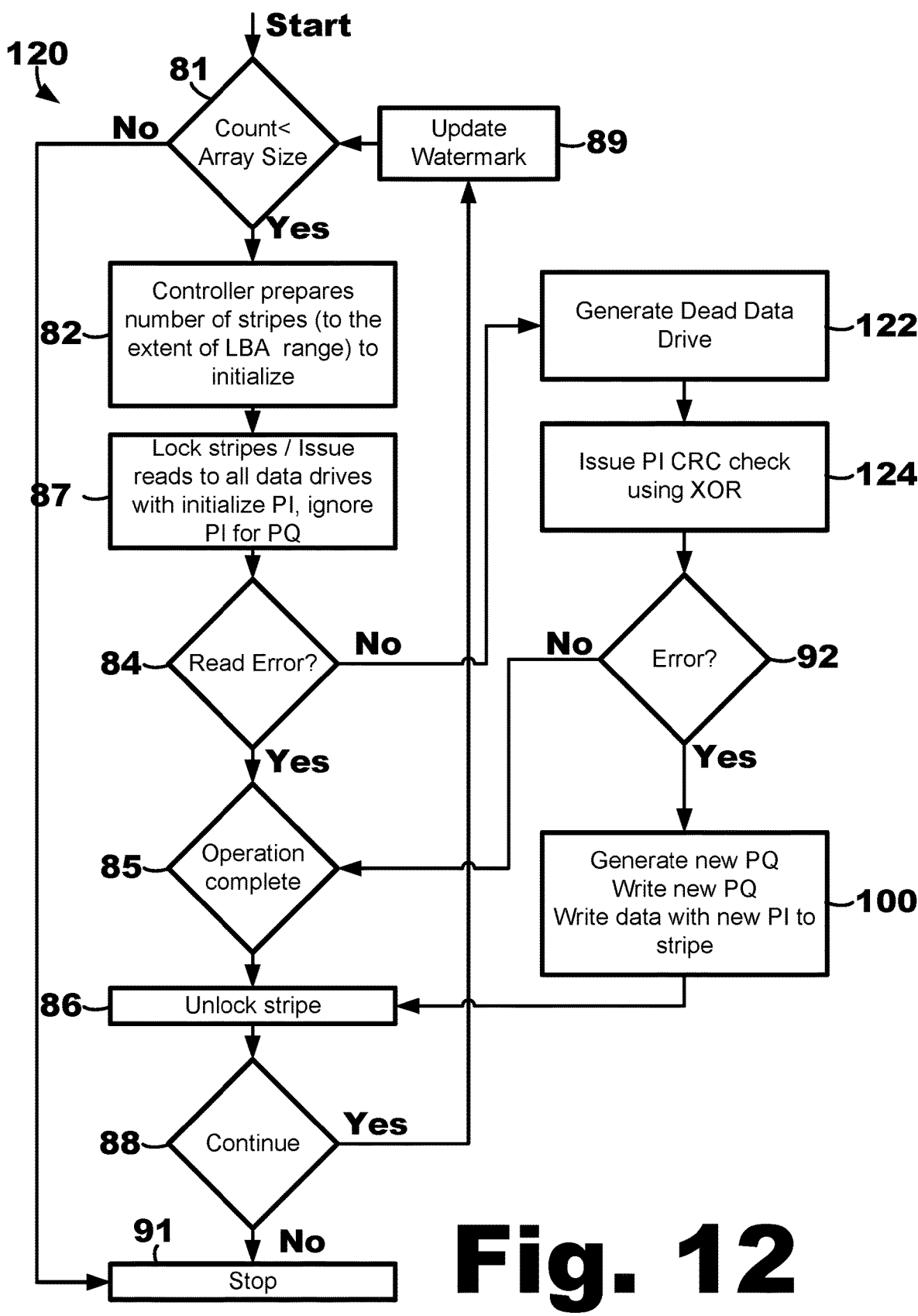
FIG. 12 is flow diagram of an illustrative method of rebuilding failed data blocks of a stripe of a diskgroup and initializing the stripe if uninitialized.

A flow diagram of illustrative method of rebuilding failed data blocks of a stripe of a diskgroup and initializing the stripe if uninitialized is depicted in FIG. 12. The method 120 is similar to the method 80 described herein with respect to FIG. 10, and as such, many processes, or steps, of method 120, which are numbered the same as in method 80, will not be further described herein. Different from method 80, however, method 120 handles storage device (e.g., disk drive) failures during initialization of the RAID system. After the stripes have been prepared 82, the stripes are locked and reads are issued to all data drives with an initialize protect information command and ignore protection information for PQ command 87, and if read without error 84, the dead data drives, or storage devices, (or one stripe at a time) may be generated based on the redundant correction information 122 and a protection information CRC check may be issued using RAID XOR engine with PI capability, or similar on a dead data drive or if P or Q is dead, issue on the first good data drive 124. For example, the a PI CRC check on the dead data drive may be issued and performed using the RAID data integrity field (DIF) generator engine. The verification of the stripe using protection information may result in no error 92 indicating that the stripe has been initialized because the protection information is correct or good. Thus, if no error is indicated 92, the method 80 may proceed to completing the operation 85 and unlocking the stripe 86.

The verification of the stripe using the protection information may result in an error 92 indicating that the stripe has not been initialized, and thus, new redundant correction information (e.g., P and Q data) may be generated and written to the stripe and data with new PI may be written to the stripe 100. After writing is complete 100, the method may proceed to unlocking the stripe 86 and then determining whether to continue 88.

In one or more embodiments, the method 120 may be referred to as a special condition for rebuilding dead storage devices in, e.g., RAID 5 or RAID 6. It may be described that if the vdisk is critical (e.g., two dead drives) or degraded (e.g., one dead drive), the method may initiate with two-dead-one dead fix to initialize the P or Q. For PI type drives, the data drives may be initialized with good PI. All data drives may be read with PI type "Initialize" to, e.g., regenerate PI for all drives again (with, e.g., vdisk lba ref tag and app tag 0xff). The dead drive may be generated using RAID XOR engine with PI capability, and the PI CRC may be checked using app tag 0x0 and ignoring the ref tag (e.g., because the host tag is not known or used in CRC check logic). If the CRC is bad, this indicates that the parity is not initialized or the host did not write anything. Thus, the dead drive and all data drives may be initialized with an app tag having a default value such as 0xFF (such that, e.g., the host ignores the ref tag check), and all data drives may be written.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Embodiments of the systems, apparatus, and methods for decoding failed data and managing a buffer are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed:

1. A system comprising:
a plurality of storage devices; and
a computing apparatus comprising one or more processors and operably coupled to the plurality of storage devices, the computing apparatus configured to:
define a plurality of stripes of data across the plurality of storage devices for a RAID array, wherein each of the plurality of stripes of data comprise redundant correction information;
read a selected stripe of the plurality of stripes of data;
determine whether the selected stripe has already been initialized based on the redundant correction information; and
initialize the selected stripe if it is determined that the selected stripe has not been initialized.

2. The system of claim 1, wherein initializing the selected stripe comprises modifying the redundant correction information to provide redundant protection of the selected stripe.

3. The system of claim 1, wherein each stripe of the plurality of stripes of data comprises a plurality of blocks, wherein each block comprises a data portion and a protection information portion, wherein initializing the selected stripe comprises generating at least a portion of the protection information for each block of the plurality of blocks of the selected stripe.

4. The system of claim 3, wherein the protection information comprises an error detection code for the block.

5. The system of claim 3, wherein the protection information comprises a logical block address provided by the storage device on which the selected stripe is located.

6. The system of claim 1, wherein the computing apparatus is further configured to:
maintain an identifier of the last stripe of the plurality of stripes to be initialized;
prior to reading the selected stripe, determine whether the selected stripe has already been initialized based on the identifier of the last stripe of the plurality of stripes to be initialized; and
prevent reading the selected stripe, determining whether the selected stripe has already been initialized, and initializing the selected stripe if it is determined that the selected stripe has already been initialized based on the identifier of the last stripe of the plurality of stripes to be initialized.

7. The system of claim 1, wherein the computing apparatus is further configured to:
receive a write data block to be written to a non-initialized stripe of the plurality of stripes of data;
initialize the non-initialized stripe; and
write the write data block to the previously non-initialized stripe.

8. A system comprising:
a plurality of storage devices; and
a computing apparatus comprising one or more processors and operably coupled to the plurality of storage devices, the computing apparatus configured to:
define a plurality of stripes of data across the plurality of storage devices for a RAID array, wherein each of the plurality of stripes of data comprise redundant correction information;
receive a write data block to be written to a selected stripe of the plurality of stripes of data;
read the selected stripe of the plurality of stripes of data;

determine whether the selected stripe has been initialized based on the redundant correction information; and initialize the selected stripe and write the write data block to the selected stripe if it is determined that the stripe has not been initialized.

9. The system of claim 8, wherein initializing the selected stripe comprises modifying the redundant correction information to provide redundant protection of the selected stripe.

10. The system of claim 8, wherein each stripe of the plurality of stripes of data comprises a plurality of blocks, wherein each block comprises a data portion and a protection information portion, wherein initializing the selected stripe comprises generating at least a portion of the protection information for each block of the plurality of blocks of the selected stripe.

11. The system of claim 10, wherein the protection information comprises an error detection code for the block.

12. The system of claim 10, wherein the protection information comprises a logical block address provided by the storage device on which the selected stripe is located.

13. The system of claim 8, wherein the computing apparatus is further configured to:
maintain an identifier of the last stripe of the plurality of stripes to be initialized;
prior to reading the selected stripe, determine whether the selected stripe has already been initialized based on the identifier of the last stripe of the plurality of stripes to be initialized; and
prevent reading the selected stripe, determining whether the selected stripe has already been initialized, and initializing the selected stripe if it is determined that the selected stripe has already been initialized based on the identifier of the last stripe of the plurality of stripes to be initialized.

14. A system comprising:
a plurality of storage devices; and
a computing apparatus comprising one or more processors and operably coupled to the plurality of storage devices, the computing apparatus configured to:
define a plurality of stripes of data across the plurality of storage devices for a RAID array, wherein each of the plurality of stripes of data comprise a plurality of data blocks, wherein at least one of the plurality of data blocks of each stripe of data comprises redundant correction information usable to rebuild the remaining data blocks of the plurality of data blocks;
rebuild at least one failed data block of a selected stripe of the RAID array based on the redundant correction information;
read the selected stripe of the plurality of stripes of data;
determine whether the selected stripe has been initialized based on one or more of a plurality of error detection codes within the plurality of data blocks of the selected stripe; and
initialize the selected stripe if it is determined that the selected stripe has not been initialized.

15. The system of claim 14, wherein determining whether the selected stripe has been initialized based on one or more of a plurality of error detection codes within the plurality of data blocks of the selected stripe comprises:
checking for errors in each of the plurality of data blocks of the selected stripe based an error detection code associated therewith, and
determining whether the selected stripe has been initialized if at least one of the plurality of data blocks comprises one or more errors.

16. The system of claim 14, wherein initializing the selected stripe comprises modifying the redundant correction information to provide redundant protection of the selected stripe.

17. The system of claim 14, wherein each stripe of the plurality of stripes of data comprises a plurality of blocks, wherein each block comprises a data portion and a protection information portion, wherein initializing the selected stripe comprises generating at least a portion of the protection information for each block of the plurality of blocks of the selected stripe.

18. The system of claim 17, wherein the protection information comprises the error detection code for the block.

19. The system of claim 17, wherein the protection information comprises a logical block address provided by the storage device on which the selected stripe is located.

20. The system of claim 14, wherein the computing apparatus is further configured to:
maintain an identifier of the last stripe of the plurality of stripes to be initialized;
prior to reading the selected stripe, determine whether the selected stripe has already been initialized based on the identifier of the last stripe of the plurality of stripes to be initialized; and
prevent reading the selected stripe, determining whether the selected stripe has already been initialized, and initializing the selected stripe if it is determined that the selected stripe has already been initialized based on the identifier of the last stripe of the plurality of stripes to be initialized.

* * * * *